United States Patent
Zeumer et al.

(10) Patent No.: US 10,823,088 B2
(45) Date of Patent: Nov. 3, 2020

(54) EXHAUST GAS FLAP

(71) Applicant: Eberspächer Exhaust Technology GmbH & Co. KG, Neunkirchen (DE)

(72) Inventors: Annika Zeumer, Wernau (DE); Steffen Schmitt, Ostfildern (DE); Andreas Wacker, Plochingen (DE); Dennis Bahr, Plochingen (DE); Sven Grötzinger, Nürtingen (DE); Matthias Grün, Altbach (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 16/578,727

(22) Filed: Sep. 23, 2019

(65) Prior Publication Data

US 2020/0095945 A1    Mar. 26, 2020

(30) Foreign Application Priority Data

Sep. 24, 2018 (DE) .......................... 10 2018 123 400

(51) Int. Cl.
*F02D 9/04* (2006.01)
*F16K 1/18* (2006.01)

(52) U.S. Cl.
CPC . *F02D 9/04* (2013.01); *F16K 1/18* (2013.01)

(58) Field of Classification Search
CPC .......... F01N 2240/36; F02D 9/06; F02D 9/08; F02D 9/10; F02D 9/1035; F02D 9/1065; F16K 31/043
See application file for complete search history.

(56) References Cited

U.S. PATENT DOCUMENTS

2017/0138274 A1*  5/2017  Stark ..................... F02D 9/1065
2017/0284310 A1* 10/2017  Delplanque ............ F02M 26/54

FOREIGN PATENT DOCUMENTS

| DE | 102009016597 B4 | 10/2012 |
| DE | 102011107088 A1 | 1/2013 |
| DE | 102014017523 A1 | 6/2015 |
| DE | 102014113332 B3 | 11/2015 |
| DE | 102014118492 A1 | 6/2016 |
| DE | 10 2015 202211 A1 | 8/2016 |
| DE | 102015222609 A1 | 5/2017 |

(Continued)

OTHER PUBLICATIONS

Machine translation of DE 102014113332 B3, accessed Jul. 19, 2020. (Year: 2020).*

*Primary Examiner* — Jonathan R Matthias
(74) *Attorney, Agent, or Firm* — McGlew and Tuttle, P.C.

(57) ABSTRACT

An exhaust gas flap includes a flap tube (12), a flap diaphragm (16) carried in the interior of the flap tube (12) on a pivot shaft (14) rotatable about a pivot axis (A), a pivot drive (30) and a coupling device (36) coupling the pivot shaft (14) to a drive shaft (34) of the pivot drive (30). The coupling device (36) includes a first coupling area (42) that positive-lockingly meshes with the drive shaft (34) and a second coupling area (44) that positive-lockingly meshes with the pivot shaft (14). A biasing element (78) is supported in relation to the coupling device (36) and is supported in relation to one shaft of the drive shaft (34) and the pivot shaft (14). The coupling device (36) is axially biased by the biasing element (78) towards the other shaft and is pre-stressed about the pivot axis in relation to the one shaft.

15 Claims, 5 Drawing Sheets

(56) References Cited

FOREIGN PATENT DOCUMENTS

| | | |
|---|---|---|
| DE | 10 2016 203794 A1 | 9/2017 |
| DE | 10 2017 105889 A1 | 10/2017 |
| DE | 102016114704 A1 | 1/2018 |

* cited by examiner

EXHAUST GAS FLAP

CROSS REFERENCE TO RELATED APPLICATIONS

This application claims the benefit of priority under 35 U.S.C. § 119 of German Application 10 2018 123 400.7, filed Sep. 24, 2018, the entire contents of which are incorporated herein by reference.

TECHNICAL FIELD

The present invention pertains to an exhaust gas flap, especially for the exhaust gas stream of an internal combustion engine, comprising a flap tube, a flap diaphragm which is carried in the interior of the flap tube on a pivot shaft rotatable about a pivot axis, a pivot drive for the pivot shaft as well as a coupling device coupling the pivot shaft to a drive shaft of the pivot drive for joint rotation about the pivot axis, the coupling device comprising a first coupling area that is in a state of rotary coupling positive-locking meshing with the drive shaft and a second coupling area that is in a state of rotary coupling positive-locking meshing with the pivot shaft.

TECHNICAL BACKGROUND

Such an exhaust gas flap is known from DE 10 2016 114 704 A1. The exhaust gas flap has a coupling device formed of two coupling elements which are bent, for example, from spring sheet metal or the like. One coupling element provides a first coupling area in which the coupling device is in a state of rotary coupling, positive-locking meshing with the drive shaft. Another coupling element provides a second coupling area in which the coupling device is in a state of rotary coupling, positive-locking meshing with the pivot shaft. Furthermore, the two coupling elements mesh with one another in their two areas located on the outside radially in relation to the pivot axis A and are in a state of rotary coupling, positive-locking meshing with one another in this manner and are axially supported in relation to one another, so that the pivot shaft is prestressed in a direction away from the drive shaft via this axial support and via the prestress generated thereby and is thus held in a defined position in the axial direction in relation to the pivot axis A.

SUMMARY

An object of the present invention is to provide an exhaust gas flap, in which a defined positioning of the drive shaft in relation to the pivot shaft is guaranteed.

This object is accomplished according to the present invention by an exhaust gas flap, especially for the exhaust gas stream of an internal combustion engine, comprising a flap tube, a flap diaphragm which is carried in the interior of the flap tube on a pivot shaft rotatable about a pivot axis, a pivot drive for the pivot shaft as well as a coupling device coupling the pivot shaft to a drive shaft of the pivot drive for joint rotation about the pivot axis. The coupling device comprising a first coupling area that is in a state of rotary coupling positive-locking meshing with the drive shaft and a second coupling area that is in a state of rotary coupling positive-locking meshing with the pivot shaft. This exhaust gas flap is characterized by a prestressing element (biasing element), which is supported in relation to the coupling device, on the one hand, and is supported in relation to one shaft of the drive shaft and the pivot shaft, on the other hand. The coupling device is axially prestressed by the prestressing element towards the other shaft of the drive shaft and the pivot shaft in the direction of the pivot axis and is prestressed about the pivot axis in relation to the one shaft of the drive shaft and the pivot shaft.

In the case of the exhaust gas flap configured according to the present invention, the function of the rotary coupling of the drive shaft and the pivot shaft, on the one hand, and the function of generating a biasing force, a prestressing force, for bringing about a defined positioning of the two shafts, on the other hand, are structurally uncoupled. This makes it possible to configure the components and the assembly units intended for providing these functions, especially the coupling device, on the one hand, and the prestressing element, on the other hand, for the functions to be performed by same, in an optimized manner.

In case of a configuration which can be embodied in a simple manner and yet operates in a reliable manner, the biasing element or prestressing element may comprise a coil spring. It should be noted that such a coil spring does not necessarily have to be configured with a constant winding radius in the direction of the pivot axis, which essentially corresponds to a longitudinal axis of the spring as well. The coil spring may have a varying winding radius in the direction of the spring longitudinal axis and may thus also have a varying course of the spring windings like a spiral spring.

For a defined connection to the one shaft, on the one hand, and to the coupling device, on the other hand, it is proposed that the prestressing element be permanently coupled in a first connection area in relation to the one shaft, being axially supported on the one shaft about the pivot axis in the circumferential direction, and be permanently coupled in a second connection area in relation to the coupling device, being axially supported on the coupling device about the pivot axis in the circumferential direction.

This can be embodied in a simple manner especially when the prestressing element is configured as a coil spring by the first connection area comprising a first winding end section extending in a first axial end area of the prestressing element and by the second connection area comprising a second winding end section extending in a second axial end area of the prestressing element.

The prestressing element may comprise in the first winding end section a first connection projection, which extends essentially axially and meshes with a connection recess of the one shaft, and the prestressing element may comprise in the second winding end section a second connection projection, which extends essentially axially and meshes with a connection recess of the coupling device. In case of the configuration of the prestressing element as a coil spring, the connection projections may be provided in an especially simple manner by axially deflecting the coil spring in the winding end sections.

In order to be able to generate a sufficient prestressing action both in the axial direction and in the circumferential direction, the prestressing element may comprise at least one winding, preferably a plurality of windings.

For the stable rotary coupling of the two shafts with one another, the coupling device may have, in the first coupling area, a first positive-locking meshing opening with a meshing opening cross-sectional geometry and the drive shaft have a positive-locking meshing end, which meshes with the first positive-locking meshing opening and has a meshing end cross-sectional geometry complementary to the meshing opening cross-sectional geometry of the first positive-locking meshing opening, and that in the second coupling area, the coupling device have a second positive-locking meshing opening with a meshing opening cross-sectional geometry and the pivot shaft have a positive-locking meshing end, which meshes with the second positive-locking meshing opening and has a meshing end cross-sectional geometry complementary to the meshing opening cross-sectional geometry of the second positive-locking meshing opening. A configuration, in which the different cross-sectional geometries have each a polygonal configuration, is especially advantageous in this case.

In order to be able to generate an unhindered axial biasing/prestressing of the coupling device in the direction towards the other shaft due to the shape of the meshing end of the one shaft, the meshing end of the one shaft may have an essentially cylindrical configuration in the direction of the pivot axis, and that the meshing end of the other shaft be configured as tapering towards the one shaft in the direction of the pivot axis. Regardless of the respective, for example, polygonal cross-sectional geometry, the essentially cylindrical configuration of the meshing end of the one shaft makes possible an essentially unhindered axial displaceability of the one shaft in relation to the coupling device even in the area, in which the one shaft and the coupling device are in a state of rotary coupling positive-locking meshing with one another. Nevertheless, because of the prestressing of the one shaft in relation to the coupling device in the circumferential direction, it is ensured that the one shaft and the coupling device are in contact with one another with no play and are prestressed against one another and no backlash between the one shaft and the coupling device thus occurs when a rotary motion is generated. The tapering configuration of the meshing end of the other shaft guarantees that a meshing with no play between the coupling device and the other shaft in the circumferential direction is generated due to the axial prestressing of the coupling device towards this shaft.

Provisions may be made in an advantageous configuration for the one shaft to be the drive shaft and for the other shaft to be the pivot shaft.

For a simple assembly of an exhaust gas flap configured according to the present invention the coupling device and the prestressing element may be carried on the one shaft in a manner secured against detachment from the one shaft, or/and that the coupling device be prestressed or be able to be prestressed by the prestressing element into an assembly preparation position on the one shaft.

To provide such a bond in an assembly preparation position, at least one locking projection, which meshes with a locking recess on the one shaft and locks the coupling device on the one shaft in an assembly preparation position, may be provided on the coupling device.

In this case, to insert the at least one locking projection into the locking recess on the one shaft, at least one receiving recess is provided, wherein the locking projection can be moved through the receiving recess for accommodation in the locking recess associated with this locking projection.

The locking recess accommodating the at least one locking projection and the receiving recess provided for moving through the locking projection may be offset in relation to one another about the pivot axis in the circumferential direction. Provisions may further be made that the at least one locking projection can be displaced essentially in the direction of the pivot axis in the locking recess accommodating this locking projection and in the receiving recess provided for moving through the locking projection.

For a configuration that is simple to embody and yet is stable, the coupling device may comprise a coupling element, which has an essentially plate-shaped configuration in the first coupling area and in the second coupling area and is aligned essentially at right angles to the pivot axis. In this case, the coupling device may have, for example, coupling element end areas that are arranged overlapping one another in at least one of the coupling areas especially in case of a one-piece configuration of the coupling device, which is thus easy to embody.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
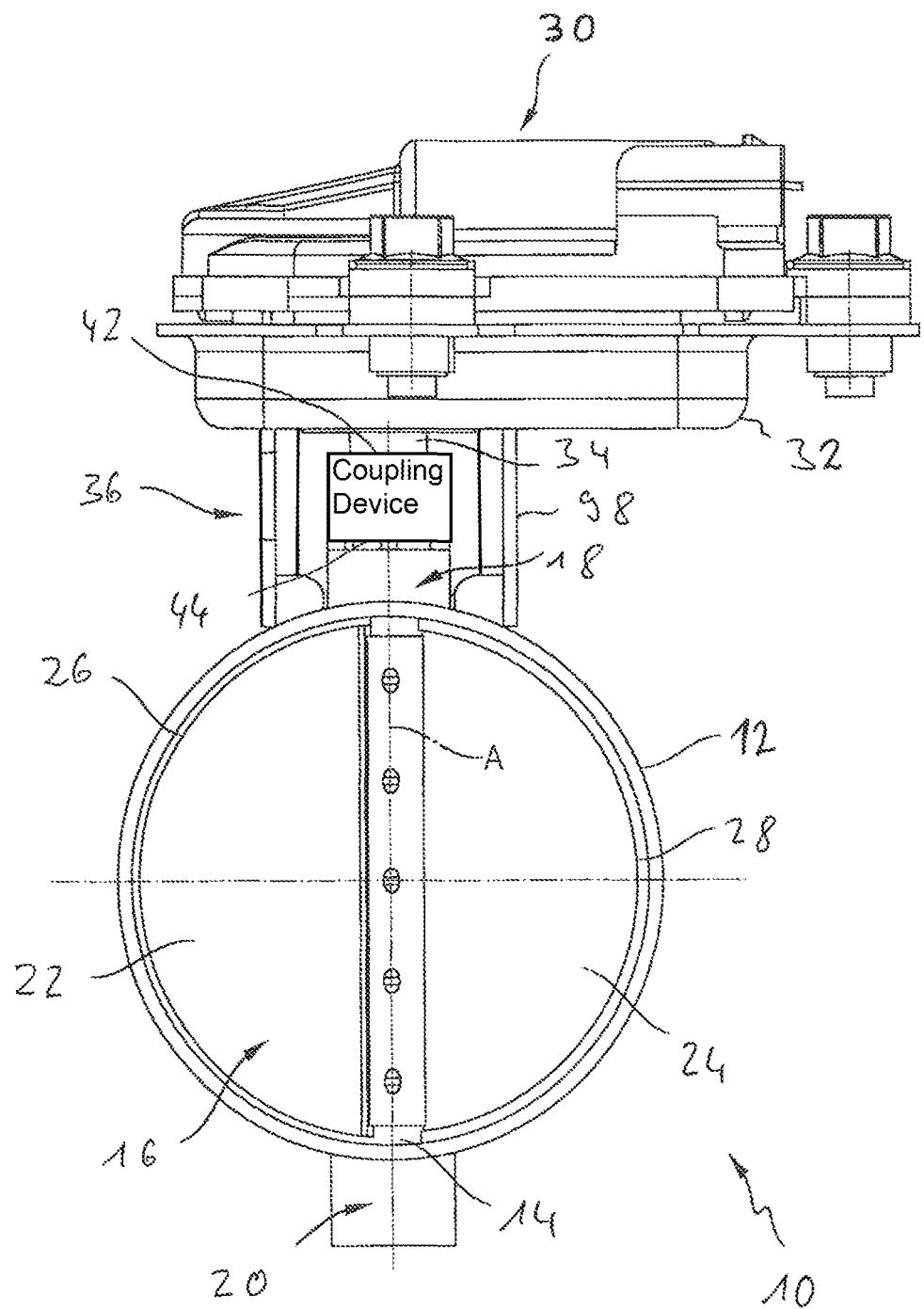
FIG. 1 is a partially schematic view showing an exhaust gas flap.
Figure 2:
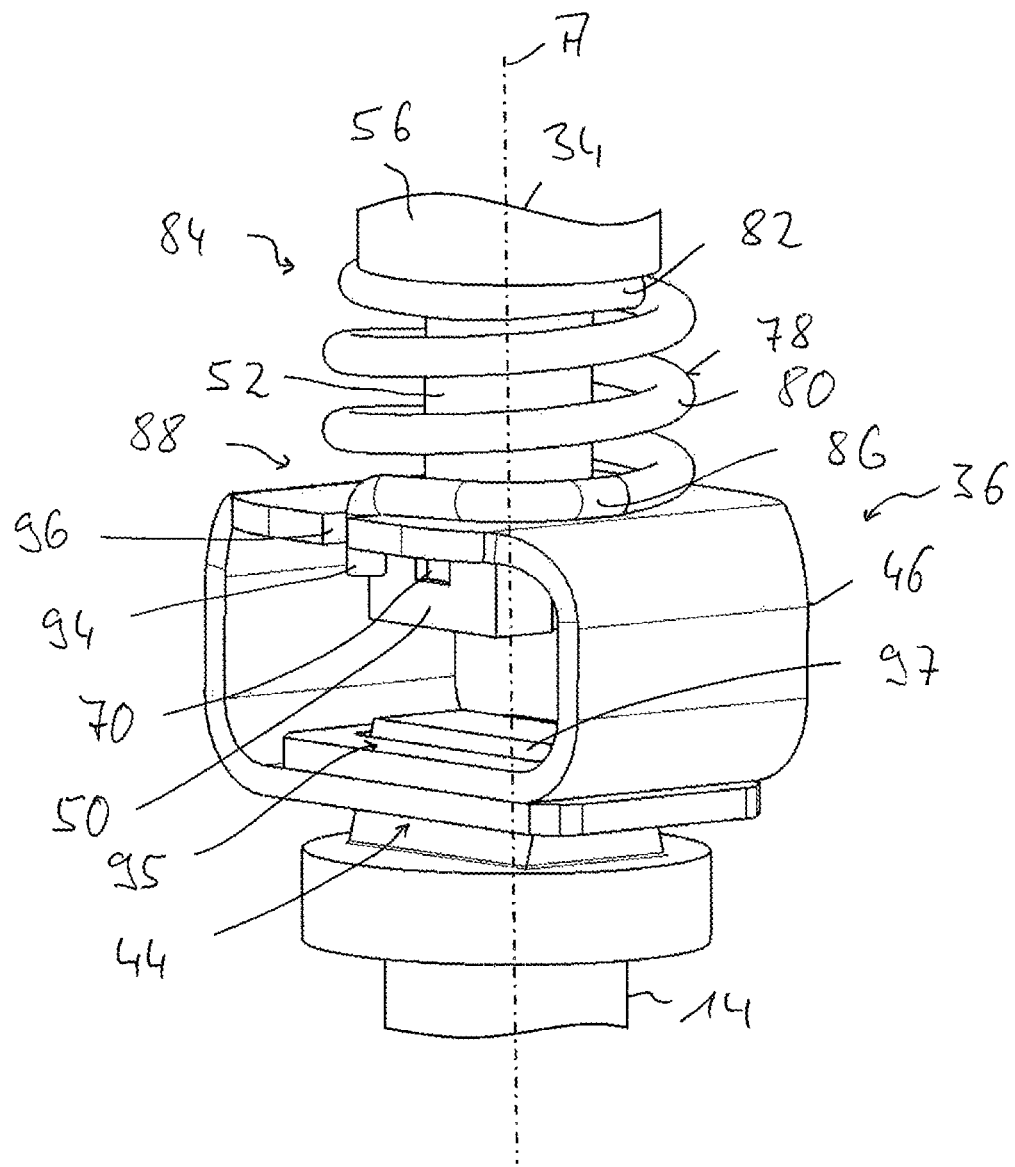
FIG. 2 is a perspective view of a drive shaft of a flap drive, which drive shaft is coupled with a pivot shaft.

Referring to the drawings, an exhaust gas flap 10 is shown in FIG. 1 comprising a flap tube 12, which is to be integrated into an exhaust system. The flap tube 12 has, for example, a circular cross section and provides a housing for a flap diaphragm 16 that is carried on a pivot shaft 14 that is rotatable about a pivot axis A. The pivot shaft 14 is carried, so as to be rotatably about the pivot axis A, on respective mounting attachments 18 and 20 at two pivot shaft end areas, which protrude from the exhaust gas pipe 12. The flap diaphragm 16 provided at the pivot shaft 14 has two diaphragm wings 24, which are in contact with respective wing stops 26, 28 on the inner circumference of the flap tube 12 in the closed state of the flap diaphragm shown in FIG. 1 and thus essentially block the exhaust gas flow path through the flap tube 12. When the flap diaphragm 16 is rotated, for example, by about 90° about the pivot axis A starting from the closed state shown in FIG. 1, the two flap wings 22, 24 are essentially aligned parallel to the flow direction of the exhaust gas, so that exhaust gas can flow through the flap tube 12 essentially unhindered.

A pivot drive 30 for the flap diaphragm 16 is carried on the flap tube 12. The pivot drive 30 comprises an electric motor accommodated in a housing 32. A drive shaft 34, of the flap drive or pivot drive 30, protrudes from the housing 32 and is coupled to the pivot shaft 14 via a coupling device generally designated by 36. The coupling device 36 provides joint rotation, to rotate the flap diaphragm 16 about the pivot axis A when the electric motor is energized.

FIGS. 2 through 5 show the coupling of the drive shaft 34 with the pivot shaft 14 for joint rotation about the pivot axis A via the coupling device 36. This coupling is embodied according to the principles of the present invention.

The coupling device 36 comprises a coupling element 46, which is bent, for example, from a strip of sheet metal to provide a first coupling area 42 and a second coupling area 44. The first coupling area 42 and the second coupling area 44, respectively, are plate-shaped and are oriented at right angles to the pivot axis A. It is seen that the two end sections of the strip of sheet metal used for making the coupling element 42 are arranged overlapping one another to provide the second coupling area 44.

In the first coupling area 42, the coupling element 46 has a first positive-locking meshing opening 48 (FIG. 3) with a polygonal meshing opening cross-sectional geometry, especially a square or quadratic meshing opening cross-sectional geometry in the exemplary embodiment shown. In association with the first coupling area 42, the drive shaft 34 has a positive-locking meshing end 50 with a meshing end cross-sectional geometry complementary to the meshing opening cross-sectional geometry of the first positive-locking meshing opening 48. This means that the positive-locking meshing end 50 also has a quadratic cross-sectional geometry in the example shown, which is shaped and dimensioned such that, in principle, the positive-locking meshing end 50 of the drive shaft 34 can be displaced in the direction of the pivot axis A in the first positive-locking meshing opening 48. For this purpose, the positive-locking meshing end 50 is configured with a cross-sectional geometry that is essentially cylindrical, i.e., is not varied with regard to its cross-sectional dimensions in the direction of the pivot axis. In a connection section 52 adjacent to the positive-locking meshing end 50, the drive shaft 34 has a cross-sectional geometry that is, for example, circular with cross-sectional dimensions reduced towards the positive-locking meshing end. At a step-like expansion area 54, the connection section 52 passes over into a body area 56 of the drive shaft 34, which body area 56 protrudes, for example, from the housing 32 of the pivot drive 30.

Inserting grooves 62, 64, which extend through the entire expansion area of the positive-locking meshing end 50, are provided on lateral surfaces 58, 60, which are located opposite one another, in the positive-locking meshing end 50 of the drive shaft 34 in the direction of the pivot axis A. Locking grooves 70, 72, which extend only over a partial area of the positive-locking meshing end 50, and in particular are closed in the direction away from the body area 56 of the drive shaft 34, are provided on the other two lateral surfaces 66, 68 of the positive-locking meshing end 50 of the drive shaft 34, which lateral surfaces 66, 68 are located opposite one another.

Locking projections 74, 76, which protrude radially inwards, are provided at the coupling element 46 in the area of the first positive-locking meshing opening at circumferential areas located opposite one another. The interaction thereof locking projections 74, 76 with the inserting grooves 62, 64 and the locking grooves 70, 72 will be described below.

A biasing element (prestressing element) 78, which is configured as a coil spring, is provided in association with the coupling element 46. The biasing/prestressing element 78 is configured with a plurality of windings 80 wound about the pivot axis A and has an approximately constant winding radius in the exemplary embodiment shown. With a first winding end section 82 the biasing/prestressing element 78 is supported in a first axial end area 84 at the step-like expansion 54 of the drive shaft 34. With a second winding end section 86 the biasing/prestressing element 78 is supported in a second axial end area 88 at the coupling element 46 in the area of the first coupling area 42. In the first winding end section 82, the biasing element 78 ends with a connection projection 90, which is generated, for example, by bending and which extends essentially axially and which meshes with an associated connection recess 92, for example, with an axially open opening of the drive shaft 34 that is formed in the area of the step-like expansion 56. In this manner, the first winding end section 82 of the biasing element 78 is held tight in the first axial end area 84 in the circumferential direction in relation to the pivot axis A in relation to the drive shaft 34 and is supported axially on the drive shaft 34. Correspondingly, a second connection projection 94, which is likewise generated, for example, by axial bending, which meshes with a connection recess 96 provided in the coupling element 46 in the first coupling area 42 and in this manner ensures a fixed connection of the biasing/prestressing element 78 to the coupling element 46 about the pivot axis A in the circumferential direction, is provided in the second winding end section.

In case of the assembly of the drive shaft 34 with the coupling element 46 and with the biasing/prestressing element 78, the biasing/prestressing element 78 is first guided over the positive-locking meshing end 50 and the connection section 52 of the drive shaft 34 until the first winding end section 82 comes into contact with the step-like expansion 54 and the first connection projection 90 meshes with the first connection recess 92. The biasing/prestressing element 78 may be dimensioned such that the second axial end area 88 protrudes axially over the positive-locking meshing end 50 at least with its second connection projection 94 in this still relaxed state of the biasing/prestressing element 78.

Figure 3:
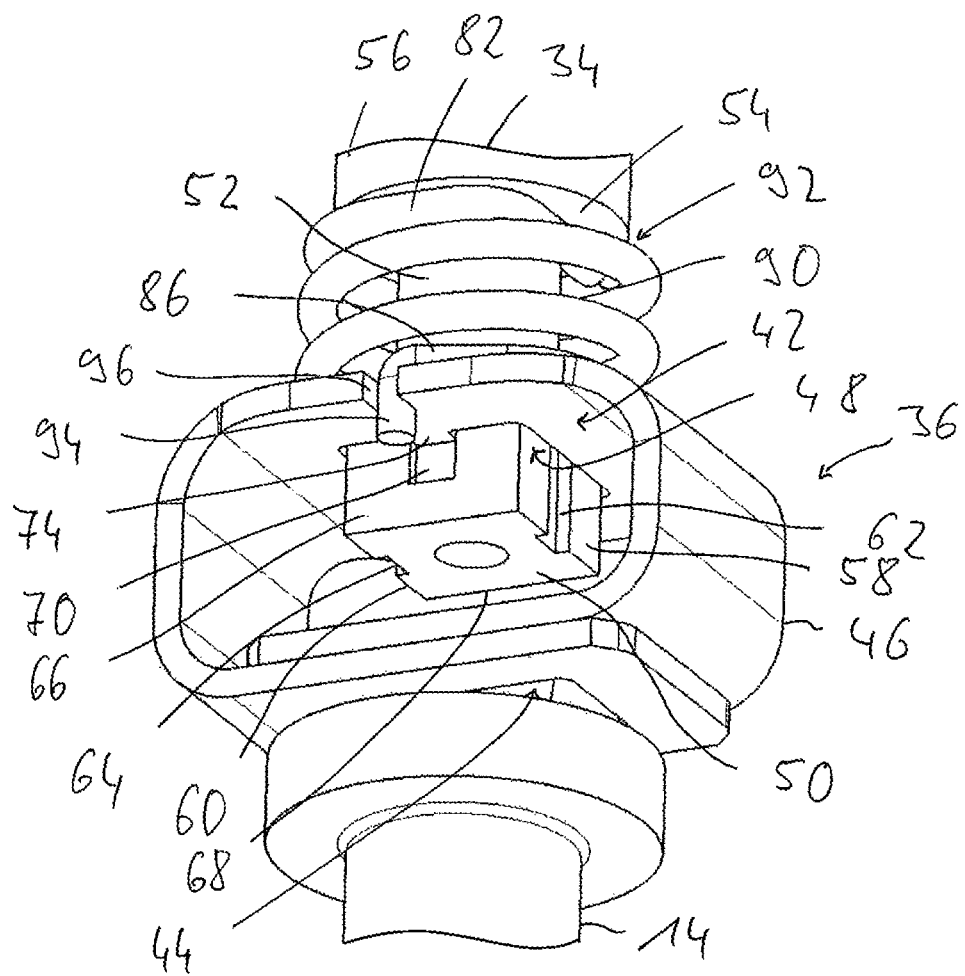
FIG. 3 is a perspective view, providing a different perspective as compared to FIG. 2.
Figure 4:
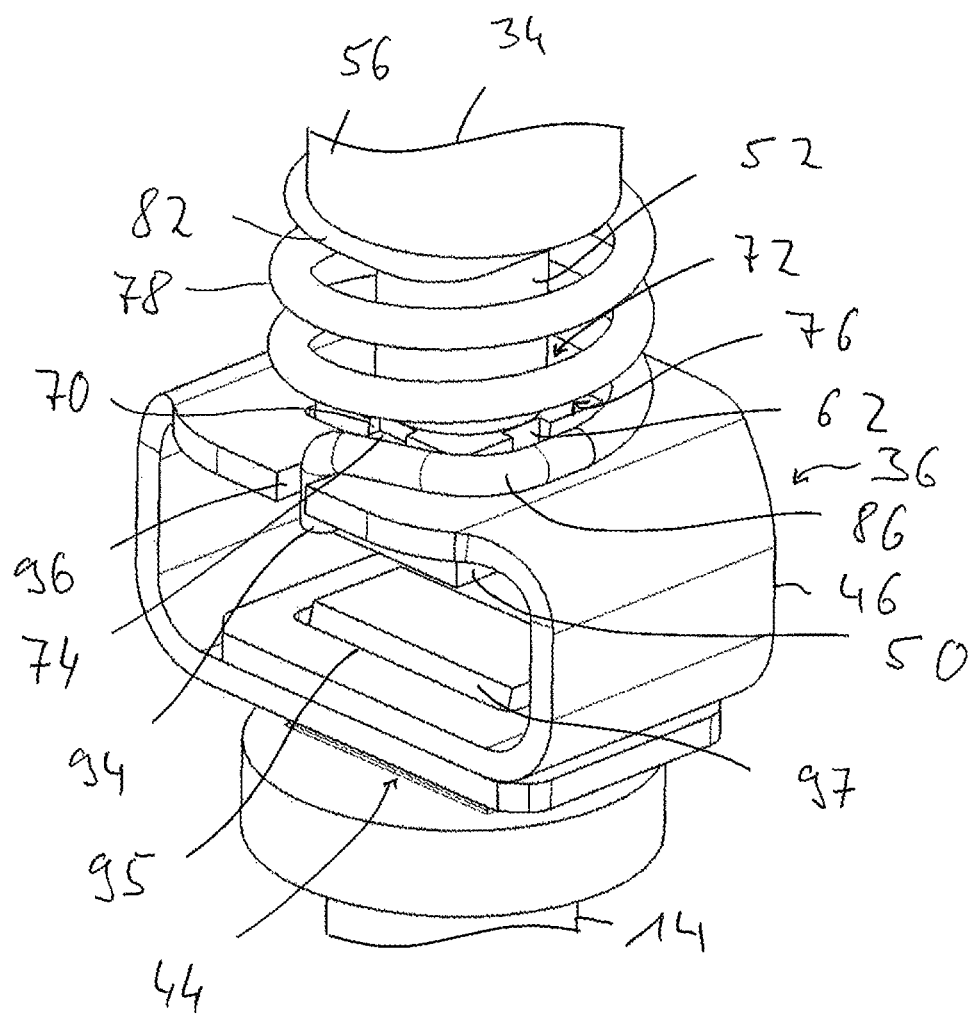
FIG. 4 is a perspective view, providing a different perspective as compared to FIG. 2.

The coupling element 46 is then guided axially to the positive-locking meshing end 50 of the drive shaft 34 in such a position that the two locking projections 74, 76 are aligned approximately with the receiving grooves 62, 64 and can be inserted into same. Before inserting the locking projections 74, 76 into the receiving grooves 62, 64, the second connection projection 94 is inserted into the second connection recess 96, for example, by the corresponding rotation and displacement of the coupling element 46. In this case, a rotation of the coupling element 46 in relation to the drive shaft 34 may then be necessary for aligning the locking projections 74, 76 with the receiving grooves 62, 64, wherein in the course of this rotation, the prestressing element 78 is wound about the pivot axis A and thereby stressed due to the relative rotation of the two winding end sections 82, 86 in relation to one another. In this case, this winding may be carried out, for example, in such a sense that, for example, in the view from FIG. 3, the coupling element 46 is rotated clockwise in relation to the drive shaft, i.e., the second coupling projection 93 in the view from FIG. 3 is moved further to the left.

In this state, the locking projections 74, 76 are then inserted into the receiving grooves 62, 64, for example, such that the locking projection 74 is accommodated in the receiving groove 62 and the locking projection 76 is accommodated in the receiving groove 64. The coupling element 46 is then pushed axially in the direction towards the step-like expansion 54 until the locking projections 74, 76 are entirely fed through the receiving grooves 62, 64 and exit from these receiving grooves at the ends thereof close to the step-like expansion 54.

Subsequently, the coupling element 46 is again rotated in relation to the positive-locking meshing end 50, preferably again in the same direction of rotation, as already described above, so that the biasing/prestressing element 78 is further stressed. This rotation is made approximately by 90°, so that the locking projection 74 is then aligned with the locking recess 70 in the circumferential direction and the locking projection 76 is aligned with the locking recess 72. Subsequently, the coupling element 46 is moved axially under axial release of the biasing/prestressing element 78 in the direction away from the step-like expansion 54 of the drive shaft 34 until the locking projections 74, 76 reach the axial ends of the locking recesses 70, 72 and are axially held tight there at the positive-locking meshing end 50 of the drive shaft 34.

In the state already described above, the coupling element 46 can, in principle, be displaced against the prestressing action of the biasing/prestressing element 78 in the direction of the pivot axis A in relation to the drive shaft 34 due to the displaceability of the locking projections 74, 76 into the locking recesses 70, 72 and also due to the cylindrical configuration of the positive-locking meshing end 50 of the drive shaft 34. Further, the coupling element 46 of the coupling device 36 is prestressed in relation to the drive shaft 34 in the circumferential direction due to prestressing of the biasing/prestressing element 78, which is also generated in the circumferential direction, so that a stable contact of the positive-locking meshing end 50 with the first coupling area 42 of the coupling device 36 with no backlash is guaranteed.

In the second coupling area 44, the coupling element 46 has a second positive-locking meshing opening 95 in its end sections, which are arranged overlapping one another. This second positive-locking meshing opening 95 may also have a polygonal, for example, rectangular cross-sectional geometry. The pivot shaft 14 meshes with the second positive-locking meshing opening 95 with a positive-locking meshing end 96 which has a meshing end cross-sectional geometry complementary to the meshing opening cross-sectional geometry of the second positive-locking meshing opening 95, i.e., also has, for example, a rectangular cross-sectional geometry. Further, the pivot shaft 14 is configured as tapering in its positive-locking meshing end 96, so that a pyramid-like or truncated pyramid-like shape of the positive-locking meshing end 96 is provided especially in case of the polygonal configuration shown.

Figure 5:
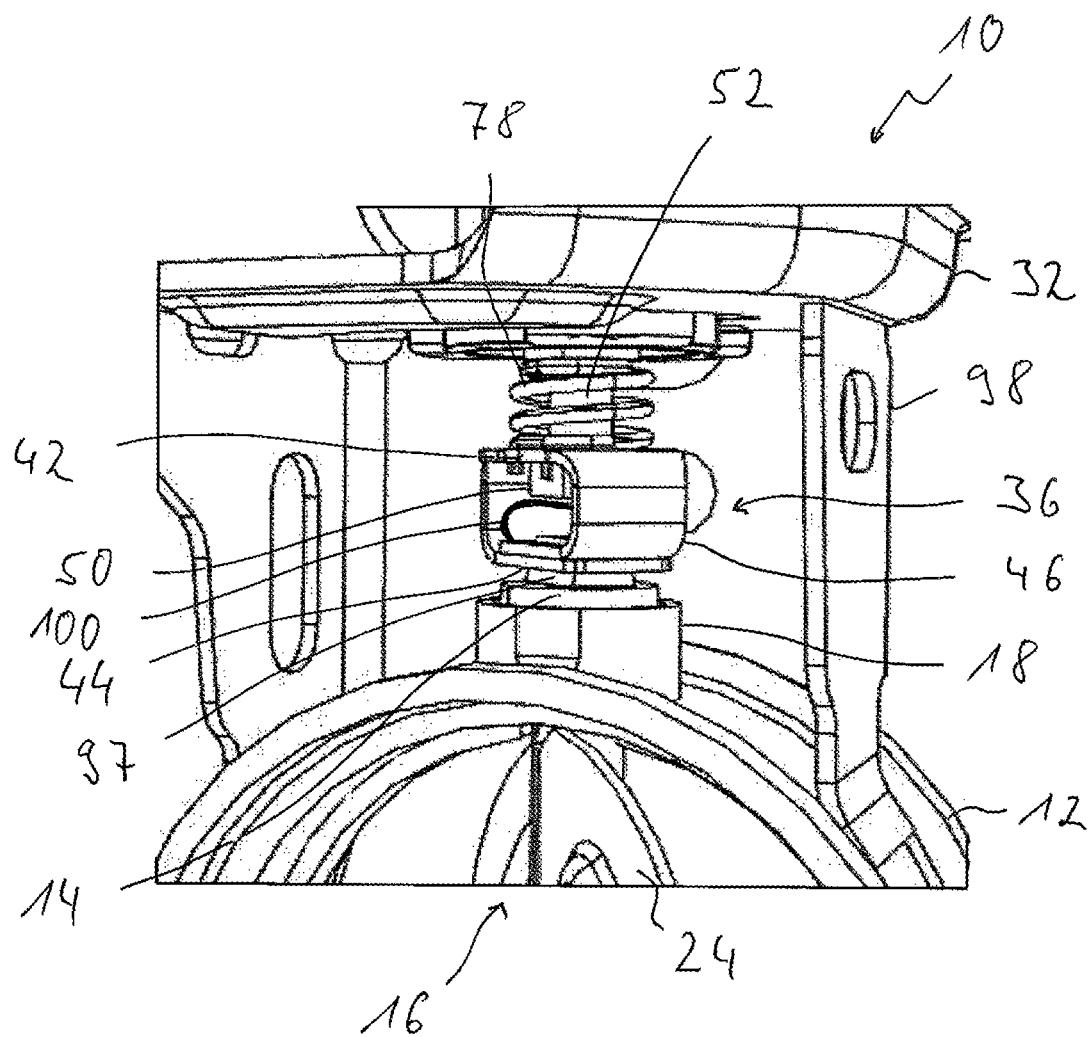
FIG. 5 is a perspective detailed view of the drive shaft of the pivot drive, which drive shaft is coupled with a pivot shaft for joint rotation.

During the assembly of the exhaust gas flap 10, when the pivot drive 30 is mounted at the flap tube 12, the pivot drive 30 is moved in the direction of the pivot axis A towards the flap tube 12 and thus towards the pivot shaft 14 with the coupling device 36 mounted on the drive shaft 34 of same in the manner described above. In the course of this movement, the positive-locking meshing end 96 of the pivot shaft 14 enters the second positive-locking meshing opening 95 of the coupling element 46. A carrier structure 98, which is intended for fixing the pivot drive 30 at the flap tube 12 and which can also be seen in FIG. 5, is dimensioned such that the prestressing element 78 has to be compressed in the direction of the pivot axis A to obtain the end position intended for assembly when the second coupling area 44 comes into axial contact with the positive-locking meshing end 97 of the pivot shaft 14 in the course of the axial movement towards one another, which positive-locking meshing end 97 has a tapering configuration. This means that in the finished assembly positioning, the coupling device 36, i.e., the coupling element 46, is prestressed due to the prestressing element 78 with the second coupling area 44 axially against the positive-locking meshing end 97 of the pivot shaft 14 and thus because of the tapering configuration thereof, it is ensured that a bond with no play between the pivot shaft 14 and the coupling element 46 in the circumferential direction is achieved as well. Subsequently, the pivot drive 30 can be fixed to the flap tube 12 via the carrier structure 98, for example, by the carrier structure 98, which was already fixed, for example, by welding to the flap tube 12 beforehand, then being fixed to the housing 32 of the pivot drive 30, for example, by positive-locking meshing like a quarter-turn fastener or/and by welding.

In the manner described above, a coupling of the drive shaft 34 with the pivot shaft 14 is achieved, in which coupling, on the one hand, any backlash in the circumferential direction is avoided and, moreover, a defined axial positioning of the pivot shaft 14 in relation to the flap tube 12 is ensured in each of the two coupling areas 42, 44 of the coupling device 36 due to the axial prestressing generated by means of the biasing/prestressing element 78 and the circumferential prestressing generated by means of the biasing/prestressing element 78. In this connection, the coupling device 36, i.e., the coupling element 46 thereof itself, only performs the functionality of providing a rotary coupling between the two shafts 34, 14, but does not itself make any substantial contribution to the generation especially of an axial prestressing force. Consequently, not only are the two shafts 14, 34 held in the circumferential direction and in an axially defined position in relation to one another, but component and assembly tolerances may also be compensated. A marked thermal uncoupling of the two shafts 14, 34 from one another is also guaranteed, since each of these two shafts 14 is in heat transfer contact with the coupling element 46 only where it is in contact with same and since, moreover, the coupling element 46 is additionally only in thermal contact with the drive shaft 34 via the prestressing element 78. High mechanical strength of the assembly unit intended for coupling and good resistance to external effects, especially to corrosion, are also achieved. Further, the displacement of the two shafts 14, 34, which is present in the direction of the pivot axis, makes possible thermally induced relative movements in relation to one another, without constraints forming in any mounting areas.

For further improvement of the thermal uncoupling, a heat radiation shielding element 100, made, for example, of sheet metal material, which is held, for example, at the coupling element 46, which can be seen in FIG. 5, may be located between the ends of the two shafts 14, 34, which ends are located opposite one another, and thus also shield these against the transfer of heat due to radiation in relation to one another.

The biasing/prestressing element 78, which is especially advantageously configured as a coil spring, ensures exclusively both the axial prestressing of the coupling device 36 against the pivot shaft 14 and the circumferential prestressing of the coupling device 36 in relation to the drive shaft 34.

Finally, it should be noted that, of course, it is also possible to embody a configuration, in which the biasing/prestressing element acts between the pivot shaft 14 and the coupling element 46, and the coupling element 46 is prestressed by the biasing/prestressing element 78 against the positive-locking meshing end 50 of the drive shaft 34. In such a configuration, the corresponding shape of the positive-locking meshing ends of the two shafts 34, 14 would then be exchanged with one another, so that in a preassembled state the coupling element 46 including the biasing/prestressing element 78 is preassembled with the pivot shaft 14 and the drive shaft 34 is then brought into positive-locking meshing with the first coupling area 42 of the coupling element 46, which first coupling area 42 is associated with this drive shaft 34 during the final assembly. Further, it should be noted that the pivot shaft 14 may have, for example, a multipiece configuration and may have a shaft section, which is carried pivotably on the flap tube 12 and carries the diaphragm wings 22, 24, as well as a shaft section that provides the positive-locking meshing end 97 and is configured as a separate component. As an alternative, the pivot shaft 14 may, of course, have a one-piece configuration with all functional sections of same.

In case of a configuration that is structurally simple to embody, the bond of the coupling element 46 with the drive shaft 34 may be achieved by the biasing/prestressing element 78 itself. For this, the winding end sections 82, 86 thereof may also be connected axially permanently, for example, by positive locking or/and connection in substance, to the drive shaft 34, on the one hand, and to the pivot shaft 14, on the other hand. For pushing the coupling element 46 onto the positive-locking meshing end 50 of the drive shaft 34, the biasing/prestressing element 78 has to be expanded in the axial direction, so that the positive-locking meshing end 50 and the positive-locking meshing opening 48 are aligned with one another while generating a torsional stress of the biasing/prestressing element 78. The coupling element 46 is pulled onto the positive-locking meshing end 5 when axial release of the biasing/prestressing element 78 is then permitted. In the state of the biasing/prestressing element 78 released in the axial direction, the first coupling area 42 is then located in the axial area of the positive-locking meshing end 50, wherein this positive-locking meshing end 50 is prestressed in relation to the coupling element 46 due to the generated torsional stress of the biasing/prestressing element 78 in the circumferential direction. An axial compression of the biasing/prestressing element 78 then takes place during assembly with the pivot shaft 14, so that the coupling element 46 is prestressed axially against the positive-locking meshing end 97, but remains meshed with the positive-locking meshing end 50 of the drive shaft 30 with its first coupling area 42. The provision of the locking recesses may be dispensed with in case of this configuration.

While specific embodiments of the invention have been shown and described in detail to illustrate the application of the principles of the invention, it will be understood that the invention may be embodied otherwise without departing from such principles.

What is claimed is:

1. An exhaust gas flap for an exhaust gas stream, exhaust gas flap comprising:
   a flap tube;
   a pivot shaft;
   a flap diaphragm carried in an interior of the flap tube on the pivot shaft to be rotatable about a pivot axis;
   a pivot drive with a drive shaft, the pivot drive driving the rotation of the pivot shaft; and
   a coupling device coupling the pivot shaft to the drive shaft of the pivot drive for joint rotation about the pivot axis, the coupling device comprising: a first coupling area that is in a state of rotary coupling, positive-locking meshing with the drive shaft; a second coupling area that is in a state of rotary coupling, positive-locking meshing with the pivot shaft; a biasing element supported in relation to the coupling device, and supported in relation to one shaft of the drive shaft and the pivot shaft, the coupling device being axially biased by the biasing element towards the other shaft of the drive shaft and the pivot shaft in the direction along the pivot axis and being biased about the pivot axis in relation to the coupling device and the one shaft of the drive shaft and the pivot shaft, for circumferentially biasing the coupling device with respect to the one shaft.

2. An exhaust gas flap in accordance with claim 1, wherein the biasing element comprises a coil spring.

3. An exhaust gas flap in accordance with claim 1, wherein the biasing element is permanently coupled in a first connection area in relation to the one shaft, being axially supported on the one shaft about the pivot axis in a circumferential direction, and is permanently coupled in a second connection area in relation to the coupling device, being axially supported on the coupling device about the pivot axis in the circumferential direction.

4. An exhaust gas flap in accordance with claim 3, wherein the first connection area comprises a first winding end section extending in a first axial end area of the biasing element and that the second connection area comprises a second winding end section extending in a second axial end area of the biasing element.

5. An exhaust gas flap in accordance with claim 4, wherein the biasing element comprises in the first winding end section a first connection projection, which extends essentially axially and meshes with a connection recess of the one shaft, and that the biasing element comprises in the second winding end section a second connection projection, which extends essentially axially and meshes with a connection recess of the coupling device.

6. An exhaust gas flap in accordance with claim 3, wherein the biasing element comprises at least one winding.

7. An exhaust gas flap in accordance with claim 3, wherein:
   in the first coupling area, the coupling device has a first positive-locking meshing opening with a meshing opening cross-sectional geometry and the drive shaft has a positive-locking meshing end, which meshes with the first positive-locking meshing opening and which has a meshing end cross-sectional geometry complementary to the meshing opening cross-sectional geometry of the first positive-locking meshing opening; and
   in the second coupling area, the coupling device has a second positive-locking meshing opening with a meshing opening cross-sectional geometry and the pivot shaft has a positive-locking meshing end that meshes with the second positive-locking meshing opening and that has a meshing end cross-sectional geometry complementary to the meshing opening cross-sectional geometry of the second positive-locking meshing opening.

8. An exhaust gas flap in accordance with claim 7, wherein:
   the positive-locking meshing end of the one shaft has an essentially cylindrical configuration in the direction of the pivot axis; and
   the positive-locking meshing end of the other shaft is configured as tapering towards the one shaft in the direction of the pivot axis.

9. An exhaust gas flap in accordance with claim 3, wherein:
   the coupling device and the biasing element are carried on the one shaft secured against detachment from the one shaft; or
   the coupling device is prestressed or can be prestressed by the biasing element into an assembly preparation position on the one shaft; or
   the coupling device and the biasing element are carried on the one shaft secured against detachment from the one shaft and the coupling device is prestressed or can be prestressed by the biasing element into an assembly preparation position on the one shaft.

10. An exhaust gas flap in accordance with claim 3, wherein at least one locking projection, which meshes with a locking recess on the one shaft and locks the coupling device on the one shaft in an assembly preparation position, is provided on the coupling device.

11. An exhaust gas flap in accordance with claim 10, wherein at least one receiving recess is provided on the one shaft, wherein the locking projection is moveable through the receiving recess for accommodation in the locking recess associated with the locking projection.

12. An exhaust gas flap in accordance with claim 11, wherein:

the locking recess accommodating the at least one locking projection and the receiving recess provided for moving through the locking projection are offset in relation to one another in the circumferential direction about the pivot axis; or the at least one locking projection can be displaced essentially in the direction of the pivot axis in the locking recess accommodating this locking projection and in the receiving recess provided for moving through the locking projection.

13. An exhaust gas flap in accordance with claim 3, wherein the one shaft is the drive shaft and the other shaft is the pivot shaft.

14. An exhaust gas flap in accordance with claim 3, wherein the coupling device comprises a coupling element, which has an essentially plate-shaped configuration in the first coupling area and in the second coupling area and is aligned essentially at right angles to the pivot axis.

15. An exhaust gas flap in accordance with claim 14, wherein the coupling device has coupling element end areas that are arranged overlapping one another in at least one of the coupling areas.

* * * * *